Aug. 23, 1960 W. H. ODLUM ET AL Re. 24,862

WALL RACK FOR MECHANICS' TOOLS

Original Filed Sept. 14, 1954

INVENTORS
WILLIAM H. ODLUM
JOHN R. GRACIOUS

BY J. Phinell Brewer

ATTORNEY

United States Patent Office

Re. 24,862

Reissued Aug. 23, 1960

24,862

WALL RACK FOR MECHANICS' TOOLS

William H. Odlum, Wilmette, and John R. Gracious, Glenview, Ill., assignors to Duro Metal Products Co., Chicago, Ill., a corporation of Illinois Original No. 2,841,289, dated July 1, 1958, Ser. No. 455,819, Sept. 14, 1954. Application for reissue Oct. 28, 1959, Ser. No. 849,423

10 Claims. (Cl. 211—87)

Matter enclosed in heavy brackets [ ] appears in the original patent but forms no part of this reissue specification; matter printed in italics indicates the additions made by reissue.

This invention relates to a wall rack for mechanics' tools such as socket wrench sets or the like.

A popular form of socket wrench is a hollow metal cylinder having an opening at one end formed to fit snugly over the corners of a nut or bolt head, and an opening at the opposite end into which may be inserted the end of a lever by which the cylinder may be turned to tighten or loosen, as the case may be, the nut or bolt. To cover the sizes of nuts or bolts commonly encountered by a mechanic, some fifteen different cylinders are required, which poses a storage problem, not only for the cylinders, but for the levers as well.

The levers may take two forms, the first being generally a rod of hexagonal cross section having one end bent at right angles to the axis of the rod and adapted to engage the cylinder, and the second having a ratchet mechanism for driving the cylinder, there being a short adaptor which is inserted between the cylinder and the ratchet mechanism.

The holders usually supplied for socket wrench sets are comprised of a portable trough in which the cylinders are arranged in progressively increasing size. The operating lever is secured over the cylinders in a manner to retain them in the trough. Such holders make no provision for storing the ratchet lever and its adaptor. It is also customary to split the cylinders into two groups, with a separate holder and operating lever for each group. This increases the possibility of misplacing parts of each set and the difficulty of keeping track of the sets. The alternative is to use a metal chest or box which, of course, is more expensive and bulky.

The principal object of this invention is to provide a holder for a socket wrench set which is adapted to be affixed to a wall or the like to provide a convenient and stationary storage facility for the set.

Another object of this invention is the provision of a holder for a socket wrench set of the "loose" cylinder type which is arranged to store the cylinders in a fixed horizontal position to prevent inadvertent spilling of the cylinders not currently being used.

A specific object of this invention is the provision of a holder for a socket wrench set of the "loose" cylinder type which is adapted to hold a ratchet type operating lever for the cylinders as well as the usual bar type lever.

Among the general objects of this invention is the provision of a holder for a socket wrench set that is made for the most part as a single piece stamping, which holds the parts of the set accessibly, which holds a ratchet lever in resilient clamping engagement, and which is economical to make and durable in use.

These and other objects of this invention will become apparent from the following detailed description when taken together with the accompanying drawings in which.

Figure 1:
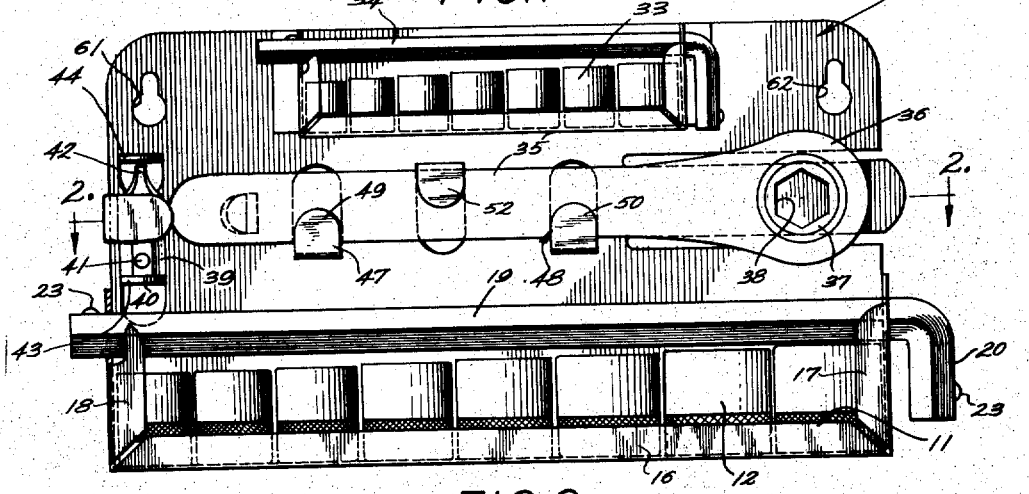
Fig. 1 is a front elevational view of a holder made in accordance with this invention and illustrating how the socket wrench set is disposed and held therein.

Referring now to the drawings for a detailed description of the invention, the holder is comprised of a substantially rectangular metal plate 10 the bottom region of which is formed into a shallow trough or retainer 11 to receive a plurality of individual cylindrical sockets 12 arranged in the trough in accordance with progressively increasing sizes of their diameters. Trough 11 is formed by bending forwardly, and substantially at right angles with the plane of plate 10, bottom and side flanges 13, 14 and 15, respectively, the ends 16, 17, 18, respectively, of the flanges being bent transversely to form the outer sides of the trough. The bottom of the trough is formed by flange 13 and is made of trapezoidal configuration, i.e. wider at the right hand end (Fig. 2) than at the left hand end thereof, to conform to the progressively larger diameters of the sockets 12 which it is to retain.

Figure 3:
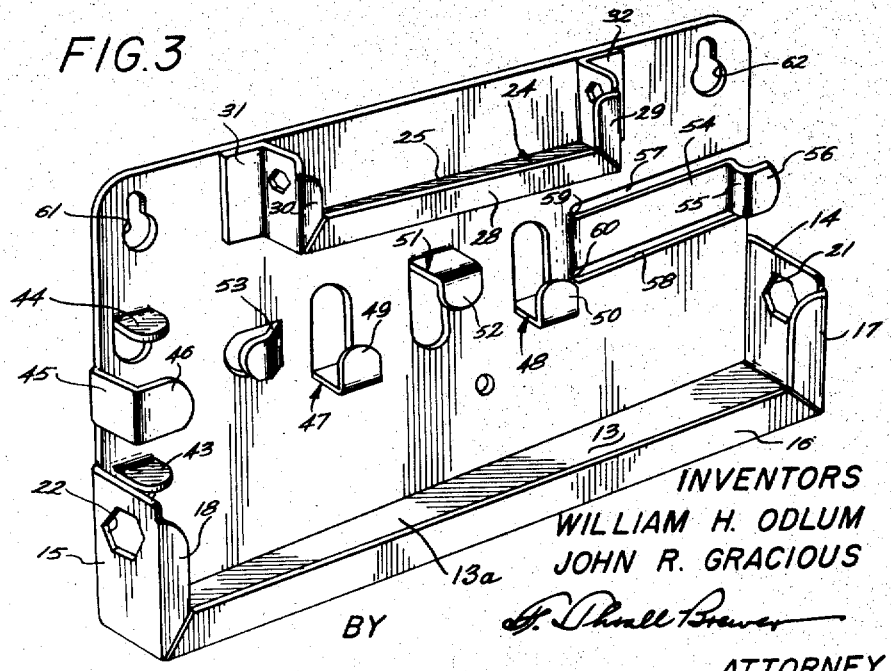
Fig. 3 is an elevational view in perspective of the holder alone.

The bar type lever for operating the sockets is shown at 19 and is of the usual hexagonal cross section. It has one end 20 bent at right angles to the axis of the bar for insertion into the driving end of the sockets. Bar 19 is longer than trough 11 and extends through hexagonal openings 21 and 22 (Fig. 3) beyond the ends of the trough. Ball type spring [latches] *latch* 23 on the left end *of said bar 19,* and [in] *bent* end 20 on the right, hold *the* bar [19] in place *against free lateral movement through openings 21 and 22,* in side flanges 15 and 14. Sockets 12 are retained in trough 11 by bar 19.

A similar trough or retainer 24, but of a smaller size, is provided at the top central region of plate 10. Said smaller trough is formed as a single stamping having a similarly trapezoidal bottom 25, upwardly extending sides 26 and 27, transversely extending retaining flanges 28, 29, 30 and a pair of outwardly disposed attaching flanges 31 and 32 by which the stamping is secured to plate 10. Trough 24 is used to hold the smaller sizes of sockets 33 which are retained in the trough in a similar fashion by a thinner hexagonal bar 34. The largest of the sockets 33, is, of course, smaller than the smallest socket 12 so that the widest part of trapezoidal bottom 25 is no larger than the smallest part of the trapezoidal bottom 13a of trough 11.

For faster operation in turning the sockets it may be desirable to provide a ratchet type lever which operates in conjunction with an adaptor taking the place of the operative end 20 of the bar 19 in the openings normally provided for said end 20. The rack of this invention is provided with means for resiliently retaining the ratchet lever and the adaptor in a convenient manner.

Figure 2:
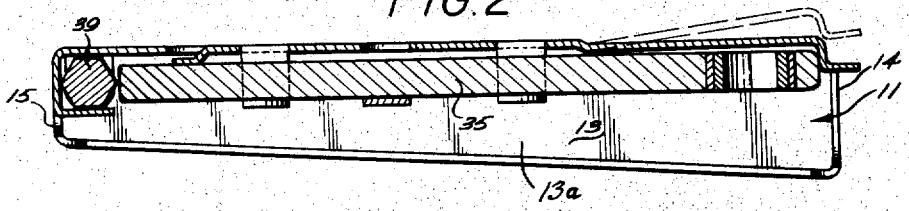
Fig. 2 is a plan view in section of the holder of Fig. 1, the section being taken along line 2—2 thereof.

The lever is shown in Figs. 1 and 2 and is comprised of a handle 35 which may be either solid, or made of a pair of complementary stampings secured together, and a head 36 shown at the right hand end of lever 35 in Figs. 1 and 2. Within head 36 is a rotatable barrel 37 having a substantially hexagonal opening 38 centrally disposed therein. A ratchet mechanism (not shown) is interposed between head 36 and socket 37 for providing a one-way drive between the head and socket. The direction of drive may be reversed merely by reversing the side of socket 37 adjacent the nut or bolt to be turned.

The adaptor is comprised of a short length 39 of hexagonal bar stock of substantially identical cross section to the end 20 of the bar 19. One end 40 of the adaptor is made substantially flat and is provided with the usual spring detent 41 for retaining the adaptor in a socket. The other end of the adaptor is ground to a taper to provide a screw driver 42 which may be used to turn machine screws or the like.

The adaptor is supported on rack 10 by a tab 43 which is struck inwardly from the central left hand region of the rack. A similar tab 44 disposed above the adaptor confines the latter to the space between the two tabs. A finger 45 extending from the left hand edge of rack 10 (Fig. 3) is bent at right angles to the general plane of rack 10 and has its end 46 bent backward upon, and spaced from, the general surface of the rack. Said finger 45 and its reversely bent end 46 serve to confine adaptor 39 on two sides.

Ratchet lever 35 is supported on rack 10 between trough 24 and bar 19 by spaced tabs 47, 48 having upwardly bent ends 49 and 50, respectively, forming hooks on which lever 35 rests. A similar tab 51, having a downwardly bent end 52, serves to retain lever 35 on its supporting tabs 47, 48.

Lever 35 is resiliently held against the bent over ends 49, 50 and 52 by an angularly disposed finger 53 struck inwardly from the front surface of rack 10 and adapted to exert a resilient force upon the back of lever 35 in the direction of the ends 49, 50 and 52. It is contemplated, however, that finger 53 will be relatively stiff and will be initially so formed and disposed relative to ends 49, 50 and 52 that lever 35 may be slid between said ends and finger 53. At the right hand end of lever 35, however, is formed a spring finger 54 having its free end bent at right angles to the plane of rack 10 and then parallel thereto as at 55 and 56 respectively. The right angle portion 55 forms a retaining wall for the right hand end (Fig. 1) of lever 35. Said retaining wall 55 is so disposed relative to the length of lever 35 that the lever will normally be held in close proximity to adaptor 39 and will effectively retain adaptor 39 within the confines of finger 45 and its reversely bent end 46.

It may be noted that slots 57 and 58, with smoothly rounded ends 59 and 60, respectively, are cut into rack 10 to provide ample clearance for movement of finger 54 transversely of the plane of rack 10 without creating fatigue cracks at the juncture between finger 54 and rack 10.

It is contemplated that lever 35 will be inserted behind the ends 49, 50 and 52 by resiliently forcing the free end 56 of finger 54 backward, that is, transversely of the plane of rack 10, until the left hand end of lever 35, as viewed in Fig. 1, can be pushed to substantially the position shown in that figure, whereupon the resilience of finger 54 will cause it to snap forward, thereby bringing wall 55 alongside the right hand end of lever 35 and retaining said lever in place on the rack as well as confining adaptor 39 to its particular location on the rack. When it is desired to remove lever 35 from the rack, pressure is exerted upon end 56 transversely of the plane of rack 10 until lever 35 clears the forward edge of wall 55, whereupon said lever may be moved to the right as viewed in Fig. 1 until it is substantially free of the rack. When lever 35 is removed, adaptor 39, of course, may also be removed, and since the two are invariably used together, there is no need to provide a holding means for the adaptor separate from lever 35.

It may be observed that the construction of the rack is such that all of the parts thereof are securely held in place, no matter what the position of the rack. Thus the rack may be placed horizontally in a tool kit without danger of the various sockets, operating bars, lever and adaptor working loose and becoming lost. However, it may be desirable to hang the rack on a wall near the operator's bench in which event keyhole slots 61, 62 are provided in the upper corners of the rack by which the rack may be removably secured to hooks, screws, nails or the like fastened to a wall.

It is understood that the foregoing description is merely illustrative of the preferred embodiment of this invention and that the scope of the invention therefore is not to be limited thereto but to be determined by the appended claims.

We claim:

1. A holder for a plurality of socket wrenches, said holder comprising an upstanding plate having flanges extending forwardly and substantially normally to the plane of the plate from its bottom edge and from the side edges adjacent the bottom edge to form the bottom and sides of a first retainer for a plurality of wrench sockets, a strip of sheet metal disposed above the said first retainer and having a horizontal section and flanges overlying and secured to the plate, said strip forming with the plate the bottom of a second retainer for a plurality of wrench sockets disposed above the first-mentioned retainer, a tab struck outwardly and downwardly from the plate, and laterally spaced tabs struck outwardly and upwardly from the plate at regions below and one on either side of the first-mentioned tab, all of said tabs being constructed to receive and hold between them the handle of a tool or the like, said flange extending from the bottom edge and said horizontal section of the strip having upstanding edges constituting retaining walls for wrench sockets supported on said bottom edge flange and horizontal section, and said bottom edge flange and horizontal section being of trapezoidal configuration, the greatest width of the horizontal section being substantially equal to the smallest width of the bottom edge flange to provide in effect a split retainer for a plurality of wrenches of progressively varying sizes.

2. A holder as described in claim 1, said strip being U-shaped and having sides extending upwardly from the ends of the horizontal section, said flanges on the strip overlying and secured to the plate being formed on the upwardly extending sides of the strip, and the bottom section of the strip being vertically spaced from the flanges extending forwardly from the side edges of the plate.

3. A holder as described in claim 1, said tabs being disposed below the strip and above the flanges extending forwardly from the side edges of the plate such that the said tool handle is disposed between the retainers for the wrenches said plate extending laterally of each side of the strip and having openings in such lateral extensions to receive a wall-mounted support or the like.

4. A holder as described in claim 1, said plate having additionally latching means formed thereon and cooperating with the wrench handle for holding said handle against lateral movement in one direction with respect to the plate.

5. A holder as described in claim 1, and said plate having in addition a lateral tab and top and bottom tabs formed in one side thereof to receive and support a wrench adaptor, said tool handle when mounted in its respective tabs serving to confine the adaptor between its said lateral, top and bottom tabs.

6. A holder as described in claim 1, said plate having friction means for holding said tool handle against portions of said tabs.

7. A holder as described in claim 1, said strip being secured to the forward side of the plate such that the plate forms a common rear wall for both retainers.

*8. A holder for a plurality of socket wrenches, said holder comprising an upstanding plate having flanges extending forwardly and substantially normally to the plane of the plate from its bottom edge and from the side edges adjacent the bottom edge to form the bottom and sides of a retainer for a plurality of wrench sockets, a tab struck outwardly and downwardly from the plate, and laterally spaced tabs struck outwardly and upwardly from the plate at regions below and one on either side of the first-mentioned tab, all of said tabs being disposed above the flanges extending from the side edges of the plate and constructed to receive and hold between them the handle of a wrench or the like, and latching means formed on the plate and cooperating with the wrench*

*handle for holding said handle against lateral movement in one direction with respect to the plate.*

*9. A holder as described in claim 8, said latching means comprising a spring finger on the plate having a forwardly extending wall constructed to extend into the path of movement of the wrench handle laterally of the plate.*

*10. A holder as described in claim 8, said plate having in addition top and bottom tabs formed in one side thereof and extending horizontally from said plate to receive and support a wrench adaptor, a lateral tab extending from the plate between the top and bottom tabs, said top, bottom and lateral tabs being located remote from said latching means and defining the top, bottom and one side of a space which is in at least partial alignment with the wrench handle, said wrench handle when mounted in its respective tabs serving to confine the adaptor between its said lateral, top and bottom tabs, and said latching means comprising a spring finger on the plate having a forwardly extending wall constructed to extend into the path of movement of the wrench handle laterally of the plate.*

References Cited in the file of this patent or the original patent

UNITED STATES PATENTS

| | | |
|---|---|---|
| 852,771 | Christoph | May 7, 1907 |
| 865,475 | Belisle | Sept. 10, 1907 |
| 881,757 | Winsor | Mar. 10, 1908 |
| 1,315,326 | Palis | Sept. 9, 1919 |
| 1,438,900 | Chase | Dec. 12, 1922 |
| 1,534,537 | Miller | Apr. 21, 1925 |
| 1,549,142 | McKenzie et al. | Aug. 11, 1925 |
| 1,557,543 | Allen | Oct. 20, 1925 |
| 1,606,979 | Turner | Nov. 16, 1926 |
| 1,625,547 | Kessler | Apr. 19, 1927 |
| 1,916,918 | Carroll | July 4, 1933 |
| 1,970,359 | Carroll | Aug. 14, 1934 |
| 2,032,331 | Rueb | Feb. 25, 1936 |
| 2,064,351 | McNaught et al. | Dec. 15, 1936 |